(12) United States Patent
Kwon et al.

(10) Patent No.: US 8,699,957 B2
(45) Date of Patent: Apr. 15, 2014

(54) TRANSMISSION/RECEPTION APPARATUS AND METHOD FOR CHANNEL ESTIMATION USING PACKET DATA CONTROL CHANNEL IN FDMA COMMUNICATION AND SYSTEM USING THE SAME

(75) Inventors: Hwan-Joon Kwon, Suwon-si (KR); Jin-Kyu Han, Suwon-si (KR); Yun-Ok Cho, Suwon-si (KR); Ju-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1098 days.

(21) Appl. No.: 11/546,570

(22) Filed: Oct. 12, 2006

(65) Prior Publication Data

US 2007/0111667 A1   May 17, 2007

(30) Foreign Application Priority Data

Oct. 12, 2005   (KR) .................. 10-2005-0096268

(51) Int. Cl.
*H04B 17/00* (2006.01)
*H04B 7/00* (2006.01)

(52) U.S. Cl.
USPC ........................................ 455/67.11; 455/522

(58) Field of Classification Search
USPC .............................................. 455/67.11, 522
See application file for complete search history.

(56) References Cited

U.S. PATENT DOCUMENTS

| 7,324,828 B2 * | 1/2008 | Nagaoka et al. ............. 455/522 |
| 7,496,132 B2 * | 2/2009 | Song ............................. 375/149 |
| 7,580,366 B2 * | 8/2009 | Kim et al. ..................... 370/252 |
| 7,623,884 B2 * | 11/2009 | Moon et al. ................... 455/522 |
| 2003/0003939 A1 * | 1/2003 | Banerjee ...................... 455/522 |

(Continued)

FOREIGN PATENT DOCUMENTS

| CN | 1 488 206 A | 4/2004 |
| CN | 1652495 A | 8/2005 |

(Continued)

OTHER PUBLICATIONS

3GPP TS 25.215 V5.7.0, "3rd Generation Partnership Project; Technical Specification Group Radio Access Network; Physical Layer—Measurements (FDD) (Release 5)", Jun. 2005, pp. 1-17, 3GPP Organizational Partners.

(Continued)

*Primary Examiner* — Nay A Maung
*Assistant Examiner* — Erica Fleming-Hall
(74) *Attorney, Agent, or Firm* — Roylance, Abrams, Berdo & Goodman, LLP

(57) ABSTRACT

A transmission/reception apparatus and method are provided for channel estimation in a mobile communication system for transmitting packet data based on FDMA, and include a transmitter for transmitting signals through a pilot channel and a control channel, and a receiver for receiving the signals of the pilot channel and the control channel and estimating a channel for demodulation of a data channel using the signal of the pilot channel and information about transmission power used when the control channel is transmitted. The receiver includes a pilot channel receiver, a control channel receiver, a control channel signal reproducer, and a channel estimator for performing channel estimation using the signals received through the pilot channel, the control channel, the signal transmitted through the control channel by the transmitter, and the information about transmission power used when the control channel is transmitted by the transmitter.

27 Claims, 6 Drawing Sheets

(56) References Cited

U.S. PATENT DOCUMENTS

| | | |
|---|---|---|
| 2003/0072253 A1* | 4/2003 | Hiramatsu .................. 370/206 |
| 2003/0108013 A1* | 6/2003 | Hwang et al. ............... 370/335 |
| 2003/0190925 A1* | 10/2003 | Ozluturk et al. ............ 455/522 |
| 2004/0233871 A1* | 11/2004 | Seki et al. ................... 370/331 |
| 2005/0002478 A1* | 1/2005 | Agami et al. ................ 375/345 |
| 2005/0105640 A1 | 5/2005 | Han et al. |
| 2005/0143113 A1* | 6/2005 | Lee et al. .................... 455/522 |
| 2005/0152478 A1* | 7/2005 | Jalloul et al. ................ 375/340 |
| 2005/0185725 A1* | 8/2005 | Maeda et al. ................ 375/260 |
| 2005/0202818 A1* | 9/2005 | Hondo et al. ................ 455/434 |
| 2006/0040698 A1* | 2/2006 | Shiu et al. ................... 455/522 |
| 2006/0140313 A1* | 6/2006 | Futami et al. ................ 375/343 |
| 2006/0203821 A1* | 9/2006 | Mizusawa et al. ........... 370/392 |
| 2006/0233289 A1* | 10/2006 | Massicotte et al. .......... 375/346 |
| 2006/0274679 A1* | 12/2006 | Khandekar et al. .......... 370/278 |
| 2006/0285484 A1* | 12/2006 | Papasakellariou et al. ... 370/208 |
| 2007/0071127 A1* | 3/2007 | Gore et al. ................... 375/267 |
| 2007/0189362 A1* | 8/2007 | D'Amico et al. ............ 375/148 |

FOREIGN PATENT DOCUMENTS

| | | |
|---|---|---|
| EP | 1 263 179 A1 | 12/2002 |
| EP | 1 560 359 A1 | 8/2005 |
| WO | 2005/069568 A1 | 7/2005 |
| WO | WO 2005083908 A1 * | 9/2005 ............... H04B 7/26 |

OTHER PUBLICATIONS

Valle, Stefano, "Doppler Spread Measurements for Tuning Pilot-Assisted Channel Estimation", Signal Processing and Information Technology, Dec. 2003, pp. 403-406, ISSPIT 2003, Processing of the $3^{rd}$ IEEE International Symposium on Dec. 14-17, 2003.

3GPP TS 25.211 V2.5.0, "3rd Generation Partnership Project (3GPP); Technical Specification Group (TSG); Radio Access Network (RAN); Working Group 1 (WG1); Physical Channels and Mapping of Transport Channels Onto Physical Channels (FDD)", Oct. 1999, pp. 1-37, 3GPP Organizational Partners.

3GPP TS 25.211 V5.7.0, "3rd Generation Partnership Project; Technical Specification Group Radio Access Network; Physical Channels and Mapping of Transport Channels Onto Physical Channels (FDD), (Release 5)", Jun. 2005, pp. 1-39, 3GPP Organizational Partners.

Zhu et al., "Channel Estimation with Power-Controlled Pilot Symbols and Decision-Directed Reference Symbols", IEEE Vehicular Technology Conference, Oct. 6-9, 2003, pp. 1268-1272, Piscataway, N.J., Usa.

European Patent Office, "Extended European Search Report", Dec. 11, 2013, pp. 1-12.

* cited by examiner

TRANSMISSION/RECEPTION APPARATUS AND METHOD FOR CHANNEL ESTIMATION USING PACKET DATA CONTROL CHANNEL IN FDMA COMMUNICATION AND SYSTEM USING THE SAME

CROSS-REFERENCE TO RELATED APPLICATIONS

This application claims the benefit under 35 U.S.C. §119(a) of Korean Patent Application No. 10-2005-0096268 entitled "Transmission/Reception Apparatus and Method for Channel Estimation Using Packet Data Control Channel in FDMA Communication and System Using the Same" filed in the Korean Intellectual Property Office on Oct. 12, 2005, the entire disclosure of which is incorporated herein by reference.

BACKGROUND OF THE INVENTION

1. Field of the Invention

The present invention relates generally to a transmission/reception apparatus and method. More particularly, the present invention relates to a transmission/reception apparatus and method for channel estimation in a mobile communication system for transmitting packet data based on a Frequency Division Multiple Access (FDMA) scheme.

2. Description of the Related Art

An Orthogonal Frequency Division Multiple Access (OFDMA) scheme, which is one of recently, widely used multiple access schemes, is a kind of FDMA scheme. An OFDMA system is a system for supporting a multiple access through different sub-carriers using a plurality of orthogonal sub-carriers.

FIG. 1 is a diagram for describing a conventional case where each of a pilot channel, a packet data channel, and a packet data control channel are carried on different sub-carriers in a mobile communication system for transmitting packet data using the OFDMA scheme. In FIG. 1, the packet data channel denotes a physical channel through which a user packet is transmitted, and the packet data control channel denotes a channel for transmitting control information required to demodulate the packet data channel. Hereinafter, the packet data channel is called a data channel, and the packet data control channel is called a control channel.

Referring to FIG. 1, a horizontal axis indicates a time axis, and a vertical axis indicates a frequency axis. Transmission Time Interval (TTI) 101 indicates a time unit in which data is transmitted, and reference numeral 102 indicates a single sub-carrier. Black colored portions indicate sub-carriers on which pilot signals are carried, wherein the sub-carriers constitute a single pilot channel. Hatched portions indicate sub-carriers on which control signals are carried, wherein the sub-carriers constitute a single control channel. White colored portions indicate sub-carriers on which data signals are carried, wherein the sub-carriers constitute a single data channel.

FIG. 2 is a flowchart illustrating a conventional method of receiving packet data in a receiver of a communication system providing a packet data service using the FDMA scheme.

Referring to FIG. 2, the receiver receives a pilot channel in step 111 and estimates a wireless channel using the received pilot channel in step 112. The receiver performs a predetermined equalization process using the obtained channel estimation information and demodulates a control channel in step 113. A predetermined Cyclic Redundancy Check (CRC) test is performed for the demodulated control channel. If a result of the CRC test is invalid in step 114, the receiver returns to step 111 to receive a pilot channel during a subsequent TTI. If the result of the CRC test is valid in step 114, the receiver determines in step 115 whether a data channel has been received. The determination in step 115 is commonly performed using a terminal identification (ID) included in control information included in the control channel. Table 1 illustrates by way of example, the control information included in the control channel.

TABLE 1

| Control information included in control channel | Number of allocated bits |
| --- | --- |
| Terminal ID | 10 |
| Size of data information | 6 |
| Modulation and Coding Scheme (MCS) information | 5 |
| Information about used resources (or resource allocation information) | 5 |

In Table 1, the terminal ID indicates an indicator previously defined between a base station and terminals to identify the terminals. The size of data information indicates the number of data bits transmitted during a predetermined TTI. The MCS information indicates which modulation method (e.g., Quadrature Phase Shift Keying (QPSK), 8 Pulse Shift Keying (8PSK), 16 Quadrature Amplitude Modulation (16QAM), 64QAM, and so forth) and which coding method (e.g., convolutional coding, turbo coding, and so forth) are used to transmit the data channel. The information about used resources (or resource allocation information) indicates an amount of wireless resources used to transmit the data channel. For example, the information about used resources includes information regarding sub-carriers used to transmit the data channel, the number of sub-carriers, and position information of the sub-carriers. Since the control information illustrated in Table 1 is only an example, the contents of the control information and/or the number of bits can be changed.

By detecting the terminal ID from among the control information illustrated in Table 1, which has been obtained in step 113, the receiver can determine in step 115 whether a data channel has been received thereto. If the receiver determines that the detected terminal ID is the same as an ID previously allocated thereto, the receiver determines in step 115 that 'data has been transmitted thereto during a current TTI'. If the receiver determines that the detected terminal ID is different from the ID previously allocated thereto, the receiver determines in step 115 that 'data has not been transmitted thereto during the current TTI'. If the receiver determines in step 115 that 'data has not been transmitted thereto during the current TTI', the receiver returns to step 111 to receive a pilot channel during a subsequent TTI. If the receiver determines in step 115 that 'data has been transmitted thereto during the current TTI', the receiver demodulates the data channel in step 116. An equalization process is then performed to demodulate the data channel, wherein the information obtained in step 112 is used as channel estimation information required for the equalization process.

As described above, the conventional equalization process for data channel demodulation is performed in the receiver of the FDMA communication system, and channel estimation information required for the equalization process is obtained from only a pilot channel. Thus, the accuracy of the channel estimation information affects the data channel demodulation. If a number of sub-carriers used to transmit the pilot channel is small, or if an amount of power allocated to transmit the pilot channel is small, it is difficult to expect correct channel estimation in the receiver. If the number of sub-carriers used to transmit the pilot channel increases, or if the amount of power allocated to transmit the pilot channel increases, a possibility that correct channel estimation information can be obtained increases. However, if the number of sub-carriers used to transmit the pilot channel increases, or if the amount of power allocated to transmit the pilot channel increases, the number of sub-carriers or power, which can be allocated to other physical channels, i.e., the data channel and the control channel, decreases, resulting in a decrease of a data rate of the data channel.

Accordingly, a need exists for a system and method for minimizing a number of sub-carriers and an amount of transmission power allocated to a pilot channel and increase a channel estimation performance.

SUMMARY OF THE INVENTION

An object of embodiments of the present invention is to substantially solve at least the above problems and/or disadvantages and to provide at least the advantages described below. Accordingly, an object of embodiments of the present invention is to provide an apparatus and method for minimizing a number of sub-carriers and an amount of transmission power allocated to a pilot channel in a mobile communication system for transmitting packet data based on a Frequency Division Multiple Access (FDMA) scheme and simultaneously increasing a channel estimation performance required to transmit a data channel and a system using the same.

According to one aspect of embodiments of the present invention, a mobile communication system for performing channel estimation using a pilot channel is provided, the mobile communication system comprising a transmitter for transmitting at least one control channel in which control information is included and the pilot channel through a wireless network, and a receiver for performing the channel estimation using pilot signals received through the pilot channel and the control information received through the control channel.

According to another aspect of embodiments of the present invention, a transmission apparatus of a mobile communication system is provided, the transmission apparatus comprising a pilot channel transmitter for transmitting a pilot channel through a wireless network, a control channel transmitter for transmitting at least one control channel in which control information is included, and a control channel transmission power information transmitter for transmitting information about transmission power of the control channel.

According to another aspect of embodiments of the present invention, a transmission apparatus of a mobile communication system is provided, the transmission apparatus comprising a pilot channel transmitter for transmitting a pilot channel through a wireless network, and a control channel transmitter for transmitting at least one control channel in which control information is included, wherein the at least one control channel is transmitted with transmission power pre-set between the transmission apparatus and a reception apparatus.

According to another aspect of embodiments of the present invention, a transmission apparatus of a mobile communication system is provided, the transmission apparatus comprising a pilot channel transmitter for transmitting a pilot channel through a wireless network, and a control channel transmitter for transmitting at least one control channel in which control information is included, wherein the at least one control channel is transmitted with transmission power pre-set according to a data rate between the transmission apparatus and a reception apparatus.

According to another aspect of embodiments of the present invention, a reception apparatus of a mobile communication system is provided, the reception apparatus comprising a pilot channel receiver for receiving a pilot channel, a control channel receiver for receiving at least one control channel in which control information is included, and a channel estimator for performing channel estimation using pilot signals received through the pilot channel and the control information received through the at least one control channel.

According to another aspect of embodiments of the present invention, a method of performing channel estimation using a pilot channel in a mobile communication system is provided, the method comprising the steps of transmitting, by a transmitter, at least one control channel in which control information is included and the pilot channel through a wireless network, and performing, by a receiver, the channel estimation using pilot signals received through the pilot channel and the control information received through the at least one control channel.

According to another aspect of embodiments of the present invention, a transmission method of a mobile communication system is provided, the transmission method comprising the steps of transmitting a pilot channel through a wireless network, transmitting at least one control channel in which control information is included, and transmitting information about transmission power of the control channel.

According to another aspect of embodiments of the present invention, a transmission method of a mobile communication system is provided, the transmission method comprising the steps of transmitting a pilot channel through a wireless network and transmitting at least one control channel in which control information is included.

According to another aspect of embodiments of the present invention, a transmission method of a mobile communication system is provided, the transmission method comprising the steps of transmitting a pilot channel through a wireless network and transmitting at least one control channel in which control information is included, wherein the at least one control channel is transmitted with transmission power pre-set according to a data rate between a transmission apparatus and a reception apparatus.

According to another aspect of embodiments of the present invention, a reception method of a mobile communication system is provided, the reception method comprising the steps of receiving a pilot channel, receiving at least one control channel in which control information is included, and performing channel estimation using pilot signals received through the pilot channel and the control information received through the at least one control channel.

BRIEF DESCRIPTION OF THE DRAWINGS

The above and other objects, features and advantages of embodiments of the present invention will become more apparent from the following detailed description when taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Figure 1:
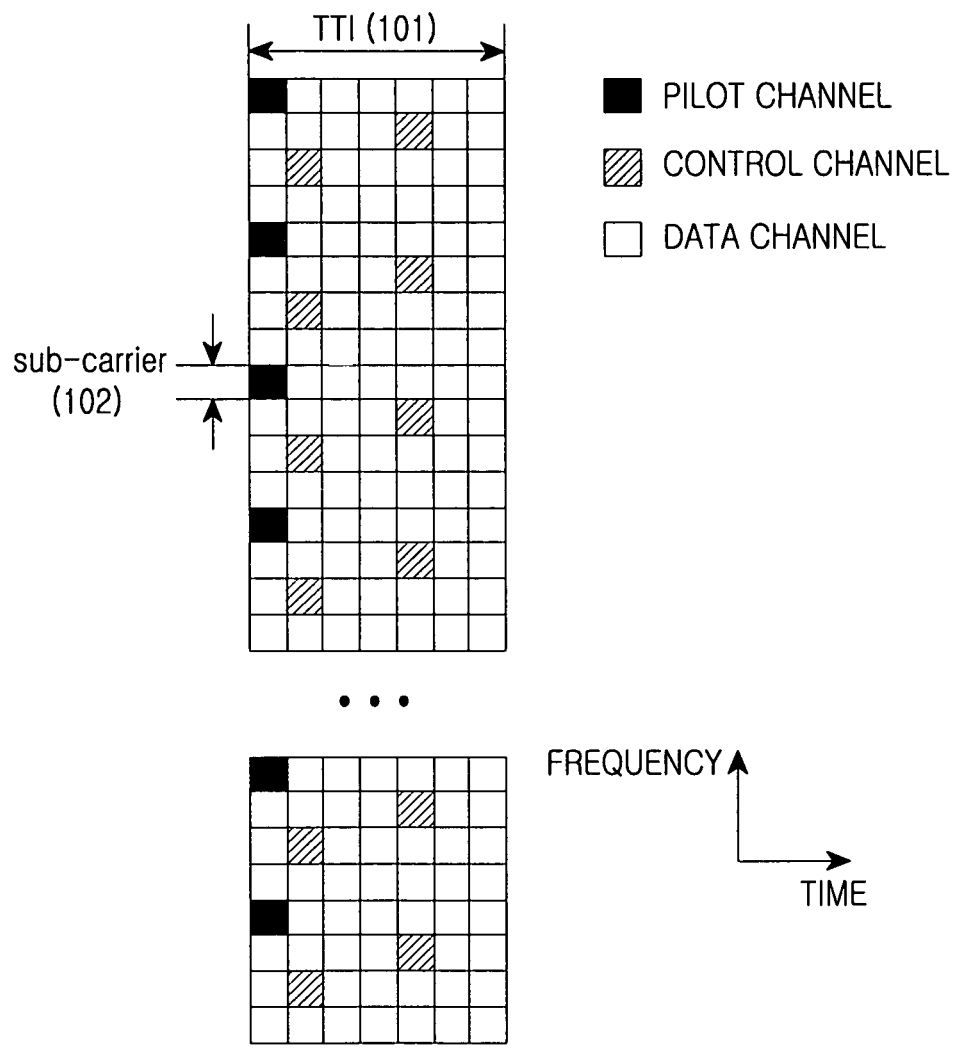
FIG. 1 is a diagram for describing a conventional case where each of a pilot channel, a packet data channel, and a packet data control channel are carried on different sub-carriers in a mobile communication system for transmitting packet data using an OFDMA scheme.
Figure 2:
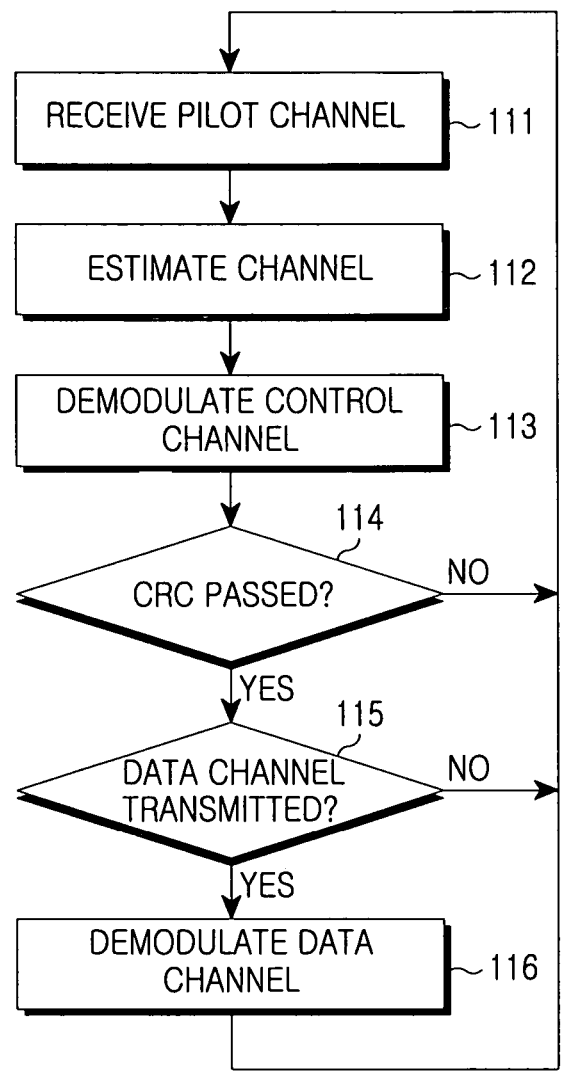
FIG. 2 is a flowchart illustrating a conventional method of receiving packet data in a receiver of a communication system providing a packet data service using an FDMA scheme.

Exemplary embodiments of the present invention will be described herein below with reference to the accompanying drawings. In the drawings, the same or similar elements are denoted by the same reference numerals even though they are depicted in different drawings. In the following description, well-known functions or constructions are omitted for clarity and conciseness.

Embodiments of the present invention teach a method of obtaining reliable channel estimation information using reception information of a control channel, obtaining more reliable channel estimation information using the obtained reliable channel estimation information and channel estimation information obtained from a pilot channel, and demodulating a data channel using the obtained more reliable channel estimation information, and a transmission and reception apparatus using the method. Embodiments of the present invention directly relate to the FDMA scheme, and although the exemplary embodiments of present invention are described using the OFDMA scheme for convenience of description, it will be understood by those skilled in the art that the present invention can be applied to the FDMA scheme, which has a relatively wider range, as well. According to an exemplary characteristic of embodiments of the present invention, a data transmitter provides transmission power information of a control channel, i.e., information about transmission power used to transmit the control channel during a specific Transmission Time Interval (TTI), to a receiver, and accordingly, the receiver can perform channel estimation using the received control channel. According to the method and apparatus taught by exemplary embodiments of the present invention, an amount of sub-carriers and transmission power allocated to a pilot channel is minimized and a channel estimation performance required for data channel demodulation is increased in a Frequency Division Multiple Access (FDMA) packet data mobile communication system, and thus, a higher amount of data can be transmitted using limited wireless resources.

Figure 3:
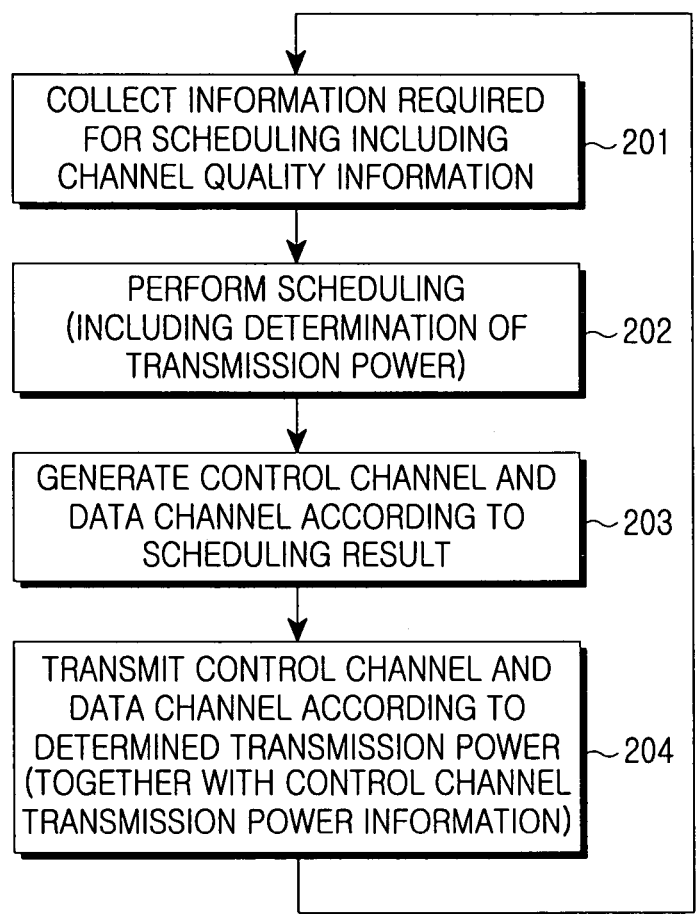
FIG. 3 is a flowchart illustrating a transmission method performed in a transmitter of a mobile communication system according to an exemplary embodiment of the present invention.

FIG. 3 is a flowchart illustrating a transmission method preformed in a transmitter of a mobile communication system according to an exemplary embodiment of the present invention, wherein the transmission method can be preformed in a base station transmitter or a terminal transmitter.

Referring to FIG. 3, a base station scheduler collects information required for scheduling, which includes channel quality information, in step 201. The channel quality information comprises information indicating the level of channel quality of physical channels existing between a base station and a terminal, and commonly, information fed back from the terminal to the base station. Since scheduling information excluding the channel quality information can have a large difference according to an implementation method and is not directly related to embodiments of the present invention, a detailed description of the scheduling information is omitted. The base station scheduler corresponds to a transmission power determiner, as shown at 402 in FIG. 5 and described in greater detail below.

The base station scheduler performs predetermined scheduling in step 202. The step of performing predetermined scheduling indicates that the control information illustrated in Table 1, such as to whom data is transmitted during a current TTI, how many resources (e.g., sub-carriers) are used to transmit the data, and so forth, is determined. In addition, in step 202, transmission power of various physical channels, i.e., a pilot channel, a control channel, and a data channel, is determined. The transmission power of the control channel can be defined as a relative ratio of the transmission power of the control channel to the transmission power of the pilot channel or other specific physical channel. However, it is assumed herein for convenience of description that the transmission power of the control channel is defined as a relative ratio of the transmission power of the control channel to the transmission power of the pilot channel. For example, if the transmission power of the pilot channel is 1 mW and the transmission power of the control channel is 2 mW, the transmission power of the control channel is defined as 3 dB.

Steps 201 and 202 are applied only to downlink transmission, i.e., transmission from the base station to the terminal, and can be omitted for uplink transmission, i.e., transmission from the terminal to the base station. In general, for the downlink transmission, the transmission power of the pilot channel, which is determined in step 202, is not changed according to time or a result of the scheduling, while the transmission power of the data channel and the transmission power of the control channel are variable.

A transmitter generates a control channel and a data channel in step 203 and transmits control information including transmission power information of the control channel through the generated control channel and data channel in step 204. The transmitter can correspond to transmitters as shown at 403-406 in FIG. 5, which are described in greater detail below. An exemplary characteristic of embodiments of the present invention is that information about transmission power used to transmit the control channel is transmitted together with the control information. As described in greater detail below with reference to FIG. 4, it is preferable to transmit the transmission power information.

A detailed method of transmitting information about transmission power used when the control channel is transmitted can be implemented using first through fifth exemplary embodiments described below. The first through third embodiments are for a downlink transmission process of a base station transmitter, and the fourth and fifth embodiments are for an uplink transmission process of a terminal transmitter.

First Exemplary Embodiment

In the downlink transmission process, a base station transmitter variably determines transmission power used to transmit a control channel in every TTI and transmits information about the determined transmission power through a single physical channel of a downlink in every TTI. For the physical channel through which the transmission power information is transmitted, the control channel for transmitting the control information illustrated in Table 1 or another physical channel can be used. In the former, control information included in the control channel can be illustrated as shown in Table 2 by way of example.

TABLE 2

| Control information included in control channel | Number of allocated bits |
| --- | --- |
| Terminal ID | 10 |
| Size of data information | 6 |
| MCS information | 5 |
| Information about used resources (or resource allocation information) | 5 |
| Information about transmission power used to transmit the control channel | 4 |

According to Table 2, the control information included in the control channel comprises a terminal ID, the size of data information, MCS information, and information about used resources and also comprises information about transmission power used when the control channel is transmitted. That is, according to the first embodiment, information about transmission power used when a control channel is transmitted is additionally included in control information and transmitted to a terminal.

Second Exemplary Embodiment

In the downlink transmission process, a base station transmitter variably determines transmission power used to transmit a control channel in every TTI and transmits control information through a control channel corresponding to the determined transmission power among previously defined various control channels which use different fixed transmission power, wherein information about the determined transmission power is not included in the control information. Unlike the first embodiment in which the transmission power information is directly transmitted, the second embodiment allows a receiver to indirectly detect the transmission power information. For example, it is assumed that a first control channel, a second control channel, and a third control channel are previously defined so as to respectively use transmission power of 0, 3, and 6 dB as a ratio to transmission power of a pilot channel. If transmission power used to transmit a control channel in a current TTI is 3 dB, the transmitter transmits control information through the second control channel. The receiver, which has received the second control channel, can detect the transmission power information according to the assumption that transmission power of 3 dB has been used for the control channel transmission. The second embodiment can also be applied differentially according to a geometric position of the receiver separate from the transmitter. For example, if the receiver is within a first distance, i.e., the shortest distance, from the base station, the transmitter transmits the control information through the first control channel, and if the receiver is within a second distance, i.e., the second shortest distance, from the base station, the transmitter transmits the control information through the second control channel.

Third Exemplary Embodiment

In the downlink transmission process, a base station transmitter variably determines transmission power used to transmit a control channel in every TTI except that a specific value is fixedly used during a specific time interval. Thus, the base station transmitter broadcasts information about the fixed transmission power used during the specific time interval to all users in its cell without transmitting information about the determined transmission power in every TTI. For example, the transmission power information can be transmitted to all users in the cell through a broadcasting channel. However, similar to the second embodiment, a plurality of control channels may be defined in the current embodiment.

Unlike the first through third embodiments, the fourth and fifth embodiments described below, are provided for an uplink transmission process in which a terminal transmits transmission power of a control channel. That is, it is assumed that data and control channels are also transmitted in an uplink.

Fourth Exemplary Embodiment

In the uplink transmission process, a terminal transmitter transmits information about transmission power used to transmit a control channel in every TTI. The transmission power information is transmitted through a control channel used in the uplink. That is, the information about transmission power used to transmit the control channel is included in the control channel and transmitted.

Fifth Exemplary Embodiment

In the uplink transmission process, a terminal transmitter does not transmit information about transmission power used to transmit a control channel to a base station in every TTI. That is, the current embodiment uses a method of using information about transmission power previously defined according to a data rate used in a current TTI without directly transmitting the transmission power information to the base station. However, since the base station can detect a data rate used by the terminal, the base station can automatically detect the information about transmission power used to transmit a control channel. In this case, the terminal transmits the control channel to the base station using a data rate designated by the base station. That is, the base station can detect transmission power corresponding to a data rate used by the terminal by detecting the data rate.

Figure 4:
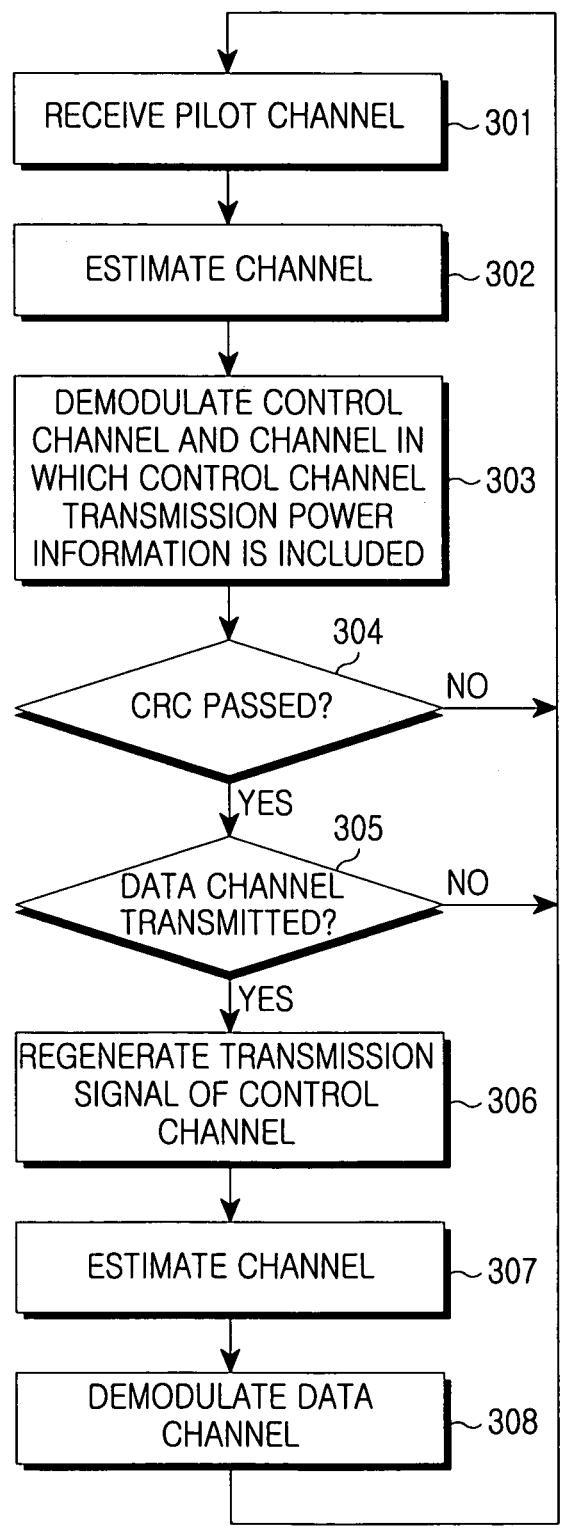
FIG. 4 is a flowchart illustrating a reception method performed in a receiver of a mobile communication system according to an exemplary embodiment of the present invention.

FIG. 4 is a flowchart illustrating a reception method performed in a receiver of a mobile communication system according to an exemplary embodiment of the present invention, wherein the reception method can be preformed in a base station receiver or a terminal receiver.

Referring to FIG. 4, the receiver receives a pilot channel in step 301 and estimates a wireless channel using the received pilot channel in step 302. The receiver demodulates a control channel and a channel in which transmission power information of the control channel is included in step 303. Here, the channel estimation information obtained in step 302 is used to perform an equalization process for the demodulation of the channels. Although the equalization process can be performed using various methods, since the equalization process is not directly related to embodiments of the present invention, a description of the equalization process is omitted. In step 303, the receiver demodulates a control channel and a channel in which transmission power information of the control channel is included. Here, a target of the demodulation varies according to the various embodiments for transmitting the information used to transmit the control channel, which are illustrated in FIG. 3.

In step 304, a predetermined CRC test is preformed for the control information obtained in step 303. If a result of the CRC test in step 304 is invalid, the receiver returns to step 301 to receive a pilot channel during a subsequent TTI. If the result of the CRC test in step 304 is valid, the receiver determines in step 305 whether a data channel has been received. The determination in step 305 can be performed using a terminal ID as described above. For example, whether a data channel has been received thereto can be determined by detecting a terminal ID included in the control information obtained in step 303. If the receiver determines that the detected terminal ID is the same as an ID previously allocated thereto, the receiver determines in step 305 that 'data has been transmitted thereto during a current TTI'. If the receiver determines that the detected terminal ID is different from the ID previously allocated thereto, the receiver determines in step 305 that 'data has not been transmitted thereto during the current TTI'. If the receiver determines in step 305 that 'data has not been transmitted thereto during the current TTI', the receiver returns to step 301 to receive a pilot channel during a subsequent TTI. If the receiver determines in step 305 that 'data has been transmitted thereto during the current TTI', the receiver regenerates a transmission signal of the control channel in order to increase reliability of channel estimation information for the data channel in step 306.

The step of regenerating a transmission signal of the control channel indicates that a signal originally transmitted by a transmitter is reproduced as it was originally transmitted by performing the same processes, i.e., channel coding, repetition, perforation, and modulation processes, used for the transmitter to transmit the control information. The signal originally transmitted by the transmitter is reproduced as it was originally transmitted to estimate a state of a physical channel by comparing the reproduced original signal to signals carried on sub-carriers corresponding to the control channel.

In step 307, the receiver performs channel estimation required to demodulate the data channel using information, such as the reproduced signal of the control channel, which is obtained in step 306, a previously determined pilot sequence, the signals carried on sub-carriers corresponding to the control channel, and signals carried on sub-carriers corresponding to the pilot channel. For the channel estimation, the information about transmission power used when the control channel is transmitted illustrated in FIG. 3 is used. The transmission power information of the control channel is defined as a relative ratio of the transmission power of the control channel to transmission power of the pilot channel as described above. If the receiver does not know a transmission power ratio of the two channels, the receiver cannot calculate a correct channel estimation value. For example, referring to FIG. 1, if transmission power allocated to the black colored sub-carriers used to transmit the pilot channel is 1 mW and transmission power allocated to the hatched sub-carriers used to transmit the control channel is 2 mW, the receiver cannot distinguish whether the intensity of reception signals corresponding to the pilot channel is relatively lower than the intensity of reception signals corresponding to the control channel, since real physical channel responses of the black colored portions and the hatched portions are different from each other, i.e., since the physical channel of the black colored portions is more degraded than the physical channel of the hatched portions, or since the transmitter supplied different transmission power to each of the two portions, and thus, the receiver cannot perform correct channel estimation.

Thus, in exemplary embodiments of the present invention as described above, an exemplary characteristic is that the transmitter transmits the transmission power information of the control channel to the receiver and the receiver knows a ratio of the transmission power of the control channel to the transmission power of the pilot channel and performs the channel estimation using the known transmission power ratio. The channel estimation can be performed by reproducing the control channel since the control channel is recognized as a known signal. That is, since the transmission signal was reproduced in step 306 after it was determined through the CRC test in step 304 that the received control information is valid, the signals carried on the sub-carriers corresponding to the control channel are known signals. The method of performing channel estimation using known signals is substantially the same as the method of performing channel estimation using signals of a pilot channel. In step 308, the receiver then demodulates the data channel using the channel estimation information obtained in step 307.

Figure 5:
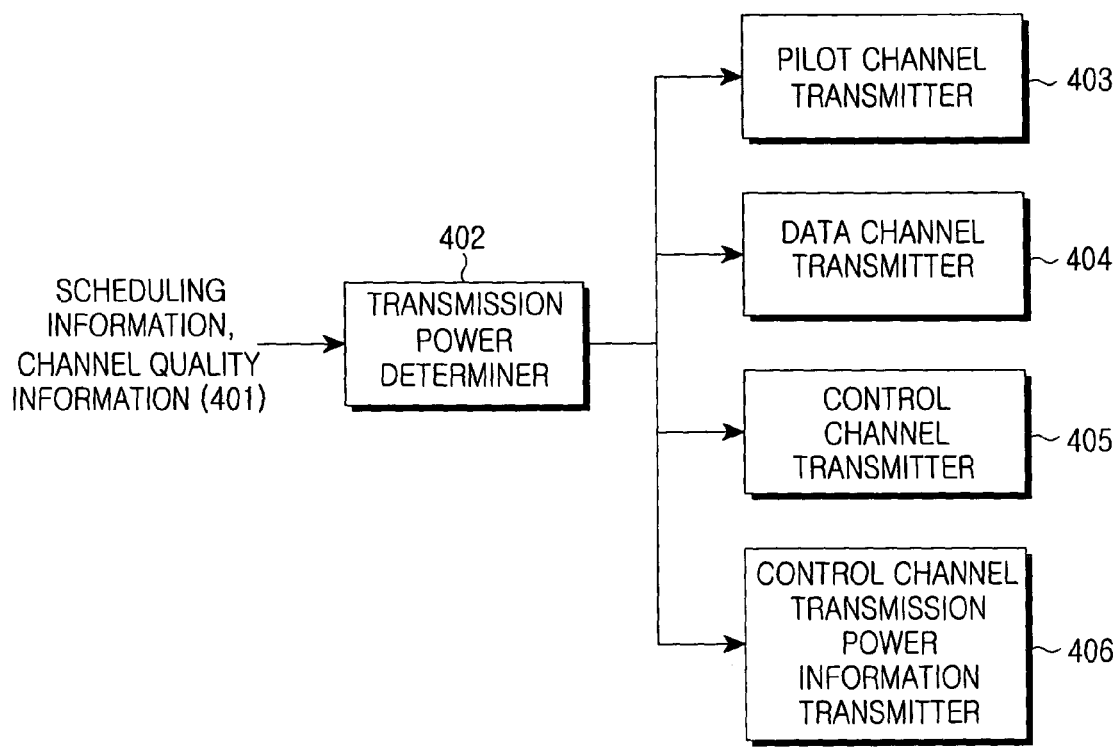
FIG. 5 is a block diagram of a transmitter of a mobile communication system according to an exemplary embodiment of the present invention.

FIG. 5 is a block diagram of a transmitter of a mobile communication system according to an exemplary embodiment of the present invention.

Referring to FIG. 5, the transmitter comprises a transmission power determiner 402, a pilot channel transmitter 403, a data channel transmitter 404, a control channel transmitter 405, and a control channel transmission power information transmitter 406. According to the various exemplary embodiments of the method of transmitting transmission power information of a control channel, the control channel transmitter 405 and the control channel transmission power information transmitter 406 may be comprised as a single block. The transmission power determiner 402 receives channel quality information and scheduling information 401 (referred to as the control information illustrated in Table 2) and controls transmission power of the pilot channel transmitter 403, the data channel transmitter 404, the control channel transmitter 405, and the control channel transmission power information transmitter 406. Here, the channel quality information is used since the transmission power of various physical channels can be variable according to channel quality of a specific user. The pilot channel transmitter 403, the data channel transmitter 404, the control channel transmitter 405, and the control channel transmission power information transmitter 406, respectively, have functions of coding, modulating, and transmitting a pilot channel, user data (packet data), control information, and control channel transmission power information.

Figure 6:
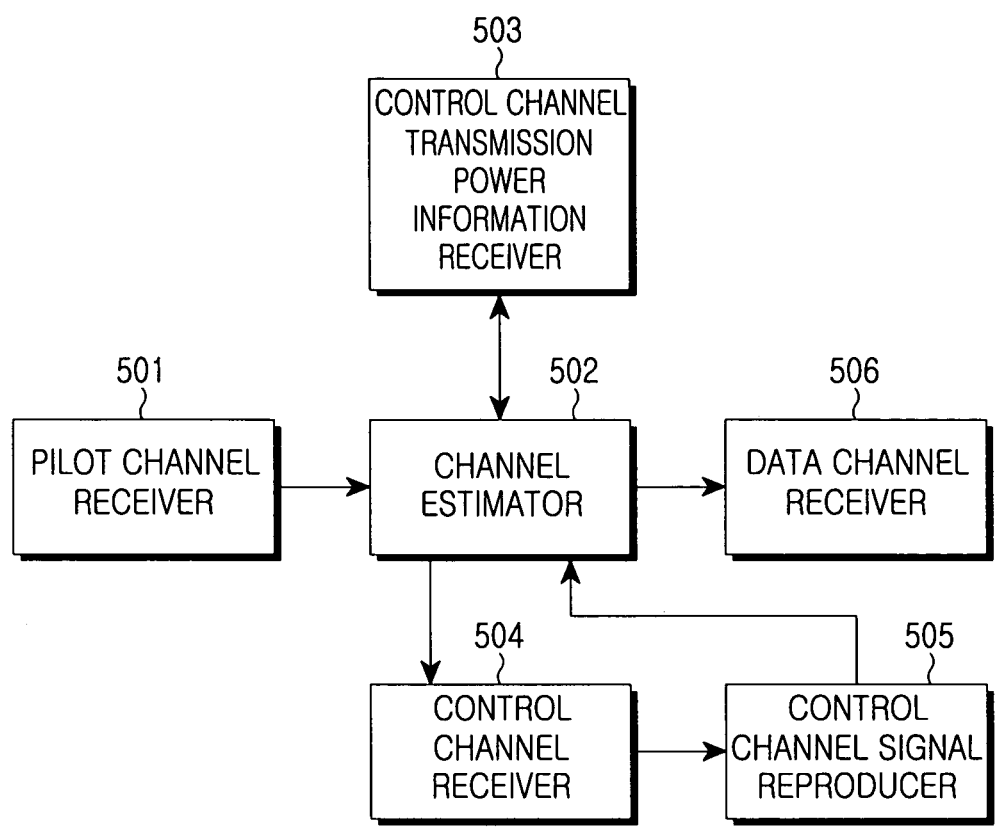
FIG. 6 is a block diagram of a receiver of a mobile communication system according to an exemplary embodiment of the present invention.

FIG. 6 is a block diagram of a receiver of a mobile communication system according to an exemplary embodiment of the present invention.

Referring to FIG. 6, the receiver comprises a pilot channel receiver 501, a channel estimator 502, a control channel transmission power information receiver 503, a control channel receiver 504, a control channel signal reproducer 505, and a data channel receiver 506. According to the various exemplary embodiments of the method of transmitting transmission power information of a control channel, the control channel transmission power information receiver 503 and the control channel receiver 504 can be comprised as a single block. The pilot channel receiver 501 receives signals carried on sub-carriers used for a pilot channel and provides the received signals to the channel estimator 502. The channel estimator 502 performs steps 302 and 307 illustrated in FIG. 4 and communicates with each of the control channel receiver 504, the control channel signal reproducer 505, and the data channel receiver 506. The control channel transmission power information receiver 503, the control channel receiver 504, and the data channel receiver 506, respectively, obtain control channel transmission power information, control information, and data by demodulating a channel through which the control channel transmission power information is transmitted, a control channel, and a data channel. The control channel signal reproducer 505 receives an output of the control channel receiver 504, i.e., the demodulated control information, and performs step 306 illustrated in FIG. 4.

As described above, according to embodiments of the present invention, by minimizing a number of sub-carriers and an amount of transmission power allocated to a pilot channel in a mobile communication system for transmitting packet data based on an FDMA scheme and simultaneously increasing a channel estimation performance required to transmit a data channel, a higher amount of data can be transmitted using limited wireless resources.

While the present invention has been shown and described with reference to a number of exemplary embodiments thereof, it will be understood by those skilled in the art that various changes in form and details may be made therein without departing from the spirit and scope of the invention as defined by the appended claims and their equivalents.

What is claimed is:

1. A transmission apparatus of a mobile communication system, the transmission apparatus comprising:
    a scheduler for determining a first transmission power for a pilot channel and a second transmission power for a control channel, the second transmission power being determined in every transmission time interval;
    a pilot channel transmitter for transmitting, to a reception apparatus, a pilot signal by using the first transmission power in the pilot channel;
    a control channel transmitter for transmitting, to the reception apparatus, at least one control signal including control information by using the second transmission power in the control channel; and
    a control channel transmission power information transmitter for transmitting, to the reception apparatus, information about the second transmission power in the every transmission time interval,
    wherein the information about the second transmission power is a ratio of the second transmission power to the first transmission power,
    wherein the information about the second transmission power is used to regenerate the at least one control signal for data channel estimation in the reception apparatus, and
    wherein the at least one control signal is regenerated by performing the same coding process as a coding process used for the transmission apparatus to transmit the at least one control signal.

2. The transmission apparatus of claim 1, wherein the information about the second transmission power is transmitted to the reception apparatus in the control channel.

3. A transmission apparatus of a mobile communication system, the transmission apparatus comprising:
    a pilot channel transmitter for transmitting, to a reception apparatus, a pilot signal by using a first transmission power in a pilot channel; and
    a control channel transmitter for transmitting, to the reception apparatus, at least one control signal including control information by using a second transmission power in a control channel,
    wherein the second transmission power is a transmission power for the control channel predetermined between the transmission apparatus and the reception apparatus,
    wherein information about the second transmission power is used to regenerate the at least one control signal for data channel estimation in the reception apparatus,
    wherein the information about the second transmission power is a ratio of the second transmission power to the first transmission power, and
    wherein the at least one control signal is regenerated by performing the same coding process as a coding process used for the transmission apparatus to transmit the at least one control signal.

4. The transmission apparatus of claim 3, wherein the control channel is one of a plurality of control channels, wherein transmission power used in each of the plurality of control channels is different.

5. The transmission apparatus of claim 3, wherein the second transmission power is transmission power predetermined between the transmission apparatus and the reception apparatus based on a data rate at the transmission apparatus.

6. A reception apparatus of a mobile communication system, the reception apparatus comprising:
    a pilot channel receiver for receiving, from a transmission apparatus, a pilot signal transmitted by using a first transmission power in a pilot channel;
    a control channel receiver for receiving, from the transmission apparatus, at least one control signal including control information, transmitted by using a second transmission power in a control channel, the second transmission power being determined in every transmission time interval;
    a control channel transmission power information receiver for receiving, from the transmission apparatus, information about the second transmission power in the every transmission time interval; and
    a channel estimator for estimating a data channel using the received pilot signal, the control information included in the received at least one control signal, and the information about the second transmission power,
    wherein the information about the second transmission power is a ratio of the second transmission power to the first transmission power, and
    wherein the channel estimator is configured to regenerate the at least one control signal using the information about the second transmission power, and use the regenerated at least one control signal for the data channel estimation, and
    wherein the at least one control signal is regenerated by performing the same coding process as a coding process used for the transmission apparatus to transmit the at least one control signal.

7. The reception apparatus of claim 6, wherein the information about the second transmission power is received from the transmission apparatus in the control channel.

8. A transmission method by transmission apparatus in a mobile communication system, the transmission method comprising the steps of:
    determining a first transmission power for a pilot channel and a second transmission power for a control channel, the second transmission power being determined in every transmission time interval;
    transmitting, to a reception apparatus, a pilot signal by using the first transmission power in the pilot channel;
    transmitting, to the reception apparatus, at least one control signal including control information by using the second transmission power in the control channel; and
    transmitting, to the reception apparatus, information about the second transmission power in the every transmission time interval,
    wherein the information about the second transmission power is a ratio of the second transmission power to the first transmission power, wherein the information about the second transmission power is used to regenerate the at least one control signal for data channel estimation in the reception apparatus, and wherein the at least one control signal is regenerated by performing the same coding process as a coding process used for the transmission apparatus to transmit the at least one control signal.

9. The transmission method of claim 8, wherein the information about the second transmission power is transmitted to the reception apparatus in the control channel.

10. A transmission method of a mobile communication system, the transmission method comprising the steps of:

transmitting, to a reception apparatus, a pilot signal by using a first transmission power in a pilot channel; and transmitting, to the reception apparatus, at least one control signal including control information by using a second transmission power in a control channel, wherein the second transmission power is a transmission power for the control channel predetermined between the transmission apparatus and the reception apparatus, wherein information about the second transmission power is used to regenerate the at least one control signal for data channel estimation in the reception apparatus, wherein the information about the second transmission power is a ratio of transmission power of the control channel to transmission power of the pilot channel, and wherein the at least one control signal is regenerated by performing the same coding process as a coding process used for the transmission apparatus to transmit the at least one control signal.

11. The transmission method of claim 10, wherein the control channel is one of a plurality of control channels, wherein transmission power used in each of the plurality of control channels is different.

12. The transmission method of claim 10, wherein the second transmission power is predetermined between the transmission apparatus and the reception apparatus based on a data rate at the transmission apparatus.

13. A reception method by a reception apparatus in a mobile communication system, the reception method comprising the steps of:

receiving, from a transmission apparatus, a pilot signal transmitted by using a first transmission power in a pilot channel;

receiving, from the transmission apparatus, at least one control signal including control information, transmitted by using a second transmission power in a control channel, the second transmission power being determined in every transmission time interval;

receiving, from the transmission apparatus, information about the second transmission power in the every transmission time interval; and estimating a data channel using the received pilot signal, the control information included in the received at least one control signal, and the information about the second transmission power, wherein the information about the second transmission power is a ratio of the second transmission power to the first transmission power, and wherein estimating the data channel comprises:

regenerating the at least one control signal using the information about the second transmission power, and using the regenerated at least one control signal for data channel estimation, and wherein the at least one control signal is regenerated by performing the same coding process as a coding process used for the transmission apparatus to transmit the at least one control signal.

14. The reception method of claim 13, wherein the information about the second transmission power is received from the transmission apparatus in the control channel.

15. A reception apparatus of a mobile communication system, the reception apparatus comprising:

a pilot channel receiver for receiving, from a transmission apparatus, a pilot signal transmitted by using a first transmission power in a pilot channel;

a control channel receiver for receiving, from the transmission apparatus, at least one control signal including control information transmitted by using a second transmission power in a control channel; and a channel estimator for estimating a data channel using the received pilot signal, the control information included in the received at least one control signal, and information about the second transmission power, wherein the second transmission power is transmission power redetermined between the transmission apparatus and the reception apparatus, and wherein the information about the second transmission power is a ratio of the second transmission power to the first transmission power, wherein the channel estimator is configured to regenerate the at least one control signal using the information about the second transmission power, and use the regenerated at least one control signal for data channel estimation, and wherein the at least one control signal is regenerated by performing the same coding process as a coding process used for the transmission apparatus to transmit the at least one control signal.

16. The reception apparatus of claim 15, wherein the control channel is one of a plurality of control channels, wherein transmission power used in each of the plurality of control channels is different.

17. The reception apparatus of claim 15, wherein the second transmission power is transmission power predetermined between the transmission apparatus and the reception apparatus based on a data rate at the transmission apparatus.

18. A reception method by a reception apparatus in a mobile communication system, the reception method comprising the steps of:

receiving, from a transmission apparatus, a pilot signal transmitted by using a first transmission power in a pilot channel;

receiving, from the transmission apparatus, at least one control signal including control information transmitted by using a second transmission power in a control channel; and estimating a data channel using the received pilot signal, the control information included in the received at least one control signal, and information about the second transmission power, wherein the second transmission power is transmission power predetermined between the transmission apparatus and the reception apparatus, wherein the information about the second transmission power is a ratio of the second transmission power to the first transmission power, and wherein estimating the data channel comprises:

regenerating the at least one control signal using the second transmission power, and using the regenerated at least one control signal for data channel estimation, and wherein the at least one control signal is regenerated by performing the same coding process as a coding process used for the transmission apparatus to transmit the at least one control signal.

19. The reception method of claim 18, wherein the control information is received from the transmission apparatus in the control channel.

20. The transmission apparatus of claim 1, wherein the data channel estimation is performed by comparing the regenerated at least one control signal to at least one control signal received in the reception apparatus.

21. The transmission apparatus of claim 3, wherein the data channel estimation is performed by comparing the regenerated at least one control signal to at least one control signal received in the reception apparatus.

22. The reception apparatus of claim 6, wherein the data channel estimation is performed by comparing the regenerated at least one control signal to the received at least one control signal.

23. The transmission method of claim 8, wherein the data channel estimation is performed by comparing the regenerated at least one control signal to at least one control signal received in the reception apparatus.

24. The transmission method of claim 10, wherein the data channel estimation is performed by comparing the regenerated at least one control signal to at least one control signal received in the reception apparatus.

25. The reception method of claim 13, wherein the data channel estimation is performed by comparing the regenerated at least one control signal to the received at least one control signal.

26. The reception apparatus of claim 15, wherein the data channel estimation is performed by comparing the regenerated at least one control signal to the received at least one control signal.

27. The reception method of claim 18, wherein the data channel estimation is performed by comparing the regenerated at least one control signal to the received at least one control signal.

* * * * *